A. SANBURN.
Bee Hive.
No. 128.
Reissued Feb. 13, 1849.
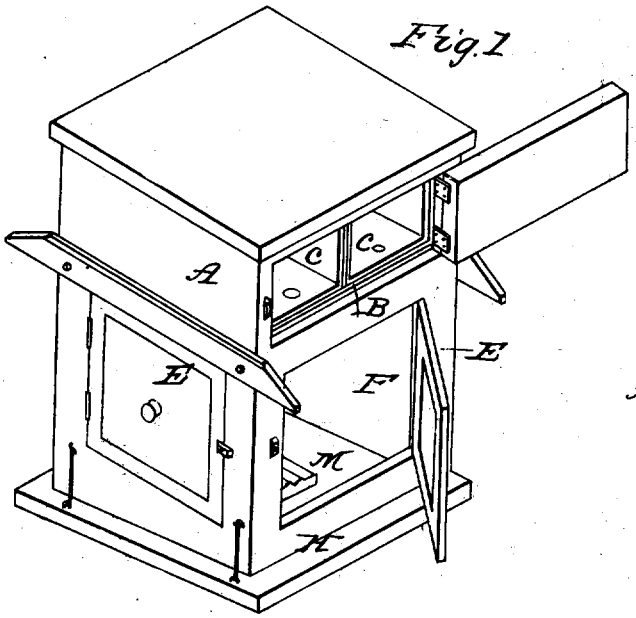
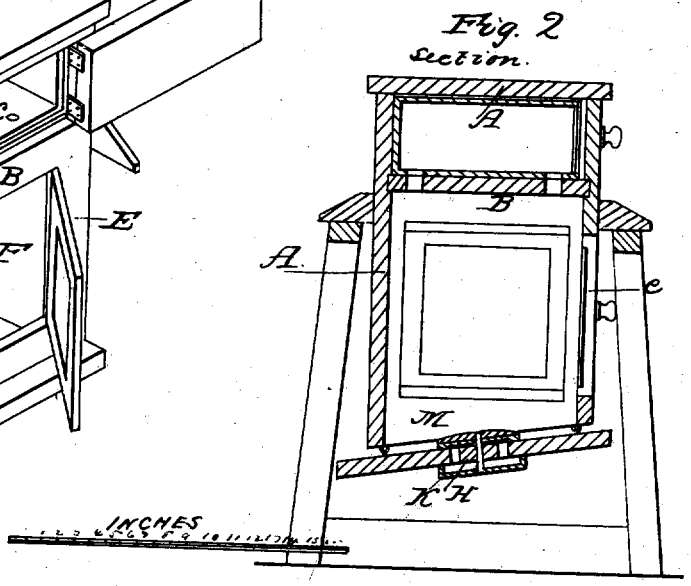
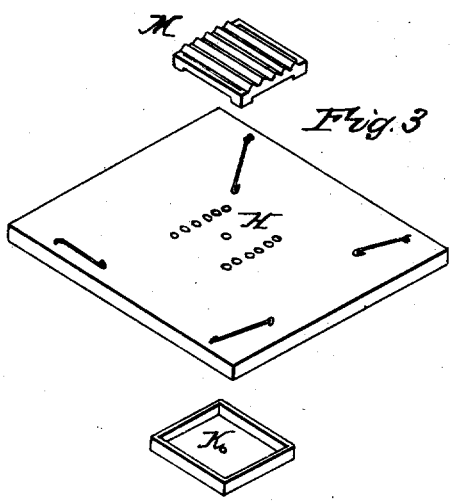
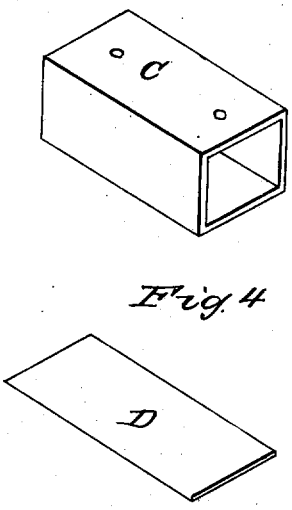
N. PETERS, Photo-Lithographer, Washington, D. C.

UNITED STATES PATENT OFFICE.

ABRAHAM SANBURN, OF SYCAMORE TOWNSHIP, HAMILTON COUNTY, OHIO.

IMPROVEMENT IN BEE-HIVES.

Specification forming part of Letters Patent No. 3,972, dated March 26, 1845; Reissue No. 128, dated February 13, 1849.

*To all whom it may concern:*

Be it known that I, ABRAHAM SANBURN, of Sycamore township, county of Hamilton, and State of Ohio, have invented new and useful Improvements in Hives for Bees; and I do hereby declare the following to be a full, clear, and exact description of the same, reference being had to the annexed drawings, making part of this specification, in which—

Figure 1 is a perspective view. Fig. 2 is a vertical section. Fig. 3 exhibits the trap or harbor in detail, and Fig. 4 one of the reserve drawers.

It has often been essayed by the apiarian so to construct the bee-hive as to protect its contents, when the bees are operating therein, from the depredations of the grub of the bee moth or miller. Having found all the varieties of hives with which I am acquainted deficient in this respect, I have through long-continued practical experience and personal observation, sought to discover a remedy and invent a hive which would fulfill the necessities of the case. A careful investigation of the circumstances attending the entrance of the moth into the hive, the attack usually made on her by the bees, and the conduct of the moth under the same, or of the habits of the moth or miller when ready to deposit her eggs and undisturbed by the bees, has unfolded to me the instincts of the insect and guided me in the construction of my invention. The moth or miller, when ready to deposit her eggs, is instructed by nature to seek some suitable place near a collection of honey or comb. In the common hive she will crawl up into the interior and lay her eggs in an empty cell, a chink in the wood, or an opening in the joints of the hive, and in sufficient numbers to furnish grubs enough to destroy it in about a month. When attacked in the ordinary hive, failing to find a place of refuge about the entrance, and her instinct prompting her to keep near the honey and comb, as affording the food most desired by her progeny, she seeks in the interior of the hive for some empty cell, or chink or opening in the joints, into which to crawl out of reach of the bees, and as her visit to the hive is for the sole purpose of depositing her eggs therein, she at once performs that function as soon as she has reached a suitable resting-place. Here the eggs are hatched, and as soon as the grubs issue from the same they commence eating the honey and boring and cutting their way through the comb, and even the wood of the hive, and spinning their webs, the thread of the same being so fine that the mandibles of the bees, when they attempt to get at the grub, fail to sever it. The thread, therefore, (as the bees never attempt to sting the grub,) forms a complete protection to the progeny of the miller, and from the time it has spun and attached a few threads to the adjacent part of the hive and comb its destructive habits and operations are continued with impunity. Many efforts have been made to prevent the entrance of the moth into the hive. Other efforts have been made to catch and destroy her when there; but as it is not the moth or miller that eats the honey, weaves the web, or obstructs the hive, it being her progeny that does the harm, to catch or destroy her is obviously unnecessary. Any contrivance for these purposes only obstructs the egress and ingress of the bees to the hive and injures them, or uselessly complicates the structure of the hive, or proves uncertain in its results. It is her progeny that does the harm, and on them it is the hand of destruction should fall. To have them so located that at the apiarian's pleasure they can be removed is all that is needed, and this can be accomplished, not by catching the moth or miller, but by affording her protection, certain and speedy, when she is attacked by the bees, or presenting her with a suitable and attractive place for the performance of her maternal functions, so readily reached that, attacked or not attacked, she will make for it as soon as she alights on the floor of the hive. When attacked, it is not her habit to attempt to fly from the bees; but as she can readily outrun them she rapidly crawls to the nearest chink, accidental or artificial, that may be at hand. Hives constructed on the principles last mentioned enjoy a complete exemption from the visits of the moth or miller, except as to their floors; and my invention applied to their floors furnishes every inducement that can attract the moth to deposit her eggs therein. This last duty of her brief existence performed, she generally dies on the spot; but it matters not what then becomes of her, so far as the welfare of the bees is concerned. The statistics of several seasons prove the efficiency of my invention, as several quarts of dead moths or millers, eggs, grubs, cocoons, and other matter have been taken therefrom, the same accruing in twelve days, and being collected from fifteen hives, nearly one-half of this quantity being a solid mass of grubs, the hives the while being perfectly exempt from the intrusion of a single one.

The nature of my invention, therefore, consists in providing an artificial harbor or place of refuge for the bee moth or miller, so arranged and located that she will invariably seek and secrete herself in the same, whether attacked or not attacked by the bee.

Another part of my invention consists in baiting this place of refuge with bee-grubs, bee-bread, honey, or comb, for the purpose of reducing to a certainty the advent of the moth thereto, as her instincts tell her that she will there most readily find and reach a refuge for herself and food for her progeny.

Another part of my invention consists in suspending the floor from the hive by means of wire hooks and staples or other equivalent devices at a suitable distance—say three-eighths of an inch—from the bottom of the sides of the hive, so that the bees and the bee moth or miller can have uninterrupted ingress and egress, (the bees to the hive and the miller to the harbor,) and also for the purpose of ventilating the hive sufficiently and at all seasons.

The hive consists of the following parts, viz: A rectangular box, A, twelve inches square inside, and open at the bottom. Five inches from the top is an inch partition, B, pierced with four holes, to correspond with similar holes in the reserve drawers C, which drawers are made to slide freely in the upper compartments. One of the drawers is shown bottom upward in Fig. 4, and also the piece of tin D, used to cut off the connection between the upper and lower chambers of the hive previous to taking out the drawer. In three sides of the hive are doors E, the openings of which, F, are closed by glass. These doors may have mirrors on the inside, to enable the apiarian to watch those transactions of the queen-bee which she will not perform when conscious of observation.

H, Fig. 2, is a vertical section of the trap or harbor and place of refuge for the moth or miller and of deposit for her eggs, showing its position beneath the hive, to the suspended floor of which it is centrally attached. Four small hooks serve to keep the floor in an inclined position, as represented, and at a distance sufficient to allow all round free ingress and egress to the bees or to the moth or miller. This trap or harbor may consist of the parts shown separately in Fig. 3. When thus made, the grating M is constructed of slats, through which the moth or miller can crawl out of reach of the bees, the openings between the slats not being large enough to permit the bees to pass through. It is attached to the floor H by a screw, as represented. Through this floor holes are bored, corresponding to the openings in the grating. These holes are larger in diameter than the breadth of the longitudinal openings in the grating, for the purpose of giving the moth or miller free access to the tray K, which is placed immediately beneath the floor of the hive in a position to cover in the holes bored in the floor. In the tray K a bait of honey or comb is placed, to afford the necessary attraction for certainly alluring the moth or miller to deposit her eggs therein under any circumstances. It is obvious that the grating M may be at once let into the floor on a level with the same by cutting out the requisite pieces from the floor instead of boring holes through it. The tray and grating are fastened to the floor by one screw, the screw passing through a portion of the floor left in the middle of the same for that purpose. This plan I prefer and use. The fallings of the comb and the droppings of the bee-bread collect in the trap and of themselves form a sufficient bait to attract the moth or miller therein during certain seasons. The hive must be made of plank, free from wind-shakes, holes, or other defects. If a chink opens, it must be filled with hard putty mixed well with litharge. The eggs hatch and the grubs are destructive in from ten to fifteen days. The trap must therefore be cleansed and the contents destroyed once in every twelve or fifteen days. This is effected by driving the bees into the upper part of the hive (not necessarily in the upper compartment) by means of smoking them, and detaching the floor-trap and all from the hive by uncatching the hooks that append them thereto, and then unscrewing the trap from the floor of the hive. It can then be baited and replaced.

Having thus fully described the nature, construction, and operation of my invention, what I claim as new, and desire to secure by Letters Patent, is—

1. Providing a harbor or place of refuge for the bee moth or miller which admits of her free ingress and egress thereto to secrete herself and lay her eggs undisturbed by the bees, the entrance to the trap not being of sufficient size to admit the passage of the bee.

2. The combination of the moth trap or harbor K, before described, with the suspended hive, A constructed and arranged in the manner set forth.

A. SANBURN.

Attest:
JAS. A. MALEY,
WM. A. SKINE.